United States Patent [19]

Furuta et al.

[11] 4,387,203

[45] Jun. 7, 1983

[54] MULTI-COMPONENT POLYMER RUBBER

[75] Inventors: Isao Furuta; Yasuhiko Takemura; Toshio Miyabayashi; Shinichiro Zen, all of Yokkaichi; Masato Sakai, Suzuka, all of Japan

[73] Assignee: Japan Synthetic Rubber Co., Ltd., Tokyo, Japan

[21] Appl. No.: 334,817

[22] Filed: Dec. 28, 1981

[30] Foreign Application Priority Data

Dec. 26, 1980 [JP] Japan ................................. 55-183847
Dec. 26, 1980 [JP] Japan ................................. 55-183848

[51] Int. Cl.³ ..................... C08F 14/18; C08F 12/20; C08F 20/22
[52] U.S. Cl. .................................. 526/245; 526/249; 526/253; 526/254; 526/255
[58] Field of Search ............... 526/245, 249, 253, 255, 526/254

[56] References Cited

U.S. PATENT DOCUMENTS 3,386,977 6/1968 Kleiner ................................. 526/245
4,095,019 6/1978 Markiewitz et al. ................ 526/249

FOREIGN PATENT DOCUMENTS 5589338 5/1980 Japan .

OTHER PUBLICATIONS

Rubber and Plastics News, (RPN Technical Notebook); Jun. 26, 1978, Edited by Dick Walker.
SAE Technical Paper Series, "High Performance Fuel Line for Emerging Automotive Needs", B. Spoo, Jun. 1980.

Primary Examiner—Harry Wong, Jr.
Attorney, Agent, or Firm—Oblon, Fisher, Spivak, McClelland & Maier

[57] ABSTRACT

A multi-component polymer rubber comprising (A) 15 to 60 mole % of an $\alpha,\beta$-unsaturated nitrile, (B) 10 to 75 mole % of a conjugated diene, and (C) 2 to 55 mole % of a fluoroalkyl acrylate or methacrylate or a fluorine-containing $\alpha$-olefin, and having a glass transition temperature ($T_g$) of $-50°$ C. to $-20°$ C., the percentages of the components (A), (B) and (C) being based on the total sum of moles of the components (A), (B) and (C). Said multi-component polymer rubber is excellent in sour gasoline resistance and alcohol-containing gasoline resistance.

8 Claims, No Drawings

MULTI-COMPONENT POLYMER RUBBER

This invention relates to a novel polymer comprising an α,β-unsaturated nitrile, a conjugated diene and a fluoroalkyl acrylate or methacrylate and/or a fluorine-containing α-olefin, which is particularly useful as a rubber material for fuel.

In recent years, regulation against automobile exhaust gas has become strict, and each car-maker has taken measures; however there has occurred a new question of formation of sour gasoline [this refers to a peroxide-containing gasoline formed by oxidation of gasoline at high temperatures, which is described in detail in A. Nersasian, Rubber and Plastics News, June 26 (1978)] during car's running.

Owing to a stringent crude oil market all over the world, one has come to try to mix an alcohol with gasoline.

As a rubber material for fuel, butadiene-acrylonitrile rubber has heretofore been used in general; however such a material is not resistant to the aforesaid sour gasoline and alcohol-containing gasoline.

As a method for remedying this defect, it is known to improve the sour gasoline resistance by using a blend of butadiene-acrylonitrile rubber and vinyl chloride (Japanese Patent Application Kokai (Laid-Open) No. 89338/80). However, the blend is inferior in other physical properties which are required as a rubber material for fuel, such as low-temperature resistance compression set, and the like and it is desired to remedy this defect. Fluororubber has come to be highlighted as a rubber material for fuel because it is excellent in the above-mentioned sour gasoline resistance and alcohol-containing gasoline resistance (see Tsuyoshi Sugimoto in Showa Neoplene Co., Ltd., "Request for Fluororubber 'Viton' of the Recent Automobile Industry" which is a material in the Lecture Meeting for Introduction of Tokai Branch of the Rubber Society of Japan). However, fluororubber is not vulcanizable with sulfur, is bad in unaged vulcanizate properties is difficult to handle, is very high in cost, and hence, cannot generally be used as a rubber material for fuel.

Therefore, the present inventors have conducted extensive research on materials which are excellent in sour gasoline resistance and alcohol-containing gasoline resistance, are vulcanizable with sulfur, and can easily be used as rubber materials for fuel by use of a conventional molding equipment and technique, and as a result thereof, it has been found that the desired novel material can be produced by copolymerizing an α,β-unsaturated nitrile, a conjugated diene and a fluoro alkyl acrylate or methacrylate and/or a fluorine-containing α-olefin. According to this invention, there is provided a multi-component polymer rubber comprising (A) 15 to 60 mole % of an α,β-unsaturated nitrile, (B) 10 to 75 mole % of a conjugated diene, and (C) 2 to 55 mole % of a fluoroalkyl acrylate or methacrylate and/or a fluorine-containing α-olefin, and which has a glass transition temperature ($T_g$) of $-50°$ C. to $-20°$ C., the percentages of the components (A), (B) and (C) being based on the sum of the moles of the components (A), (B) and (C).

Examples of the α,β-unsaturated nitrile, i.e., the component (A) used in this invention are acrylonitrile, α-chloroacrylonitrile, α-fluoroacrylonitrile, methacrylonitrile, ethacrylonitrile, and the like. Among them, acrylonitrile is particularly preferred.

The conjugated diene (B) used in this invention includes, for example, 1,3-butadiene, 2-chloro-1,3-butadiene, 2-fluoro-1,3-butadiene, 2-methyl-1,3-butadiene, and the like. Among them, 1,3-butadiene is particularly preferred.

The fluoroalkyl acrylate or methacrylate (C) used in this invention preferably has 1 to 20 carbon atoms, more preferably 1 to 15 carbon atoms, in the alkyl group, and examples thereof are 1,1-dihydroperfluoroethyl acrylate or methacrylate, 1,1-dihydroperfluoropropyl acrylate or methacrylate, 1,1,5-trihydroperfluorohexyl acrylate or methacrylate, 1,1,2,2-tetrahydroperfluoropropyl acrylate or methacrylate, 1,1,7-trihydroperfluoroheptyl acrylate or methacrylate, 1,1-dihydroperfluorooctyl acrylate or methacrylate, 1,1-dihydroperfluorodecyl acrylate or methacrylate, and the like. Among them, 1,1-dihydroperfluoroethyl acrylate or methacrylate, 1,1-dihydroperfluoropropyl acrylate or methacrylate is particularly preferred.

The fluorine-containing α-olefin (C) includes, for example, vinylidene fluoride, tetrafluoroethylene, chlorotrifluoroethylene, dichlorodifluoroethylene, hexafluoropropylene, 1,1,1-trifluoropropylene, 1-hydropentafluoropropylene, and the like. Among them, chlorotrifluoroethylene and/or dichlorodifluoroethylene are particularly preferred.

The fluoroalkyl acrylate or methacrylate and the fluorine-containing α-olefin may be used alone or in combination.

In the polymer of this invention, the proportions of the components (A), (B) and (C) are as follows based on the total sum of moles thereof: the component (A), 15 to 60 mole %, preferably 20 to 55 mole %, more preferably 20 to 45 mole %; the component (B), 10 to 75 mole %, preferably 20 to 75 mole %, more preferably 30 to 70 mole %; and the component (C), 2 to 55 mole %, preferably 2 to 45 mole %, more preferably 2 to 35 mole %.

When the proportion of the component (A) in the polymer is less than 15 mole %, the polymer is inferior in solvent resistance, and when it exceeds 60 mole %, the polymer becomes resinous and is inferior in not only processability but also low-temperature resistance.

When the proportion of the component (B) is less than 10 mole %, the polymer is inferior in rubber elasticity and unsatisfactory in unaged vulcanizate properties, and when it exceeds 75 mole %, the polymer is inferior in solvent resistance, alcohol-containing gasoline resistance and sour gasoline resistance.

When the proportion of the component (C) is less than 2 mole %, no effect is brought about on the sour gasoline resistance and alcohol-containing gasoline resistance, and when it exceeds 55 mole %, the polymer is inferior in low-temperature resistance.

The glass transition temperature ($T_g$) of said copolymer is $-50°$ C. to $-20°$ C., and where the $T_g$ of such a polymer composition becomes lower than $-50°$ C., the copolymer is unsatisfactory in oil resistance, while where the $T_g$ of the polymer composition becomes higher than $-20°$ C., the copolymer is unsatisfactory in low-temperature resistance.

The polymer of this invention is produced by radical polymerization, and the polymerization method may be any known general polymerization method including bulk polymerization, solution polymerization, emulsion polymerization, and suspension polymerization, in which the monomer and other components may be added batchwise, continuously, or intermittently to synthesize the polymer.

As the radical polymerization initiator, there may be used conventional free radical catalysts such as peroxides, redox catalysts, persulfates and azo compounds. As to the polymerization temperature, the polymerization is possible in a temperature range from 5° C. to 80° C., though it is preferably 5° C. to 60° C.

The polymer obtained by the above mentioned reaction can be recovered in the form of an elastomer by a conventional coagulation method using a metal salt such as calcium chloride or the like, or a conventional coagulation method using a non-solvent such as ethanol, methanol or the like.

The state of the multi-component polymer produced according to this invention may be solid or liquid depending on the purpose. The molecular weight of the terpolymer is not critical, though its Mooney viscosity ($ML_{1+4}$, 100° C.) is preferably 30 to 150 when the copolymer is used in a solid state.

If necessary, the multi-component polymer of this invention may be incorporated with one or more conventional compounding agents such as vulcanizing agents, vulcanization accelerators, reinforcing agents, fillers, plasticizers, softening agents, antioxidants, stabilizers, blowing agents, and the like, and can easily be vulcanized by a conventional vulcanization method. The vulcanizing agents may freely be selected from vulcanizing agents for general rubber such as those of sulfur type, thiuram type, organic peroxide type and the like.

Similarly to conventional butadiene-acrylonitrile rubbers, the multi-component polymer of this invention may also be blended, if necessary, with polyvinyl chloride or the like.

By vulcanization, the multi-component polymer of this invention gives a vulcanization product which is excellent in tensile strength, elongation, low-temperature resistance, alcohol-containing gasoline resistance, sour gasoline resistance, and oil resistance, and has a small compression set. Therefore, said copolymer is favorably used as a rubber material for various fuels.

This invention is more concretely explained below referring to Examples, which are not by way of limitation but by way of illustration. In the Examples and Comparative Examples, parts are by weight, unless otherwise specified.

EXAMPLES 1 TO 5 AND COMPARATIVE EXAMPLES 1 TO 8

Polymerization was effected at 50° C. in an autoclave having a capacity of 6 liters by using the monomers and polymerization agents shown below:

| | |
|---|---|
| Acrylonitrile | |
| 1,3-butadiene | 100 parts |
| Fluoroalkyl acrylate or methacrylate | (see Table 1) |
| Water | 200 parts |
| Alkylsulfate type soap | 5 parts |
| Potassium phosphate | 0.2 part |
| Tertiary dodecylmercaptan | see Table 1 |
| $FeSO_4 \cdot 7H_2O$ | 0.006 part |
| Trisodium salt of ethylenediamine-tetraacetic acid | 0.020 part |
| Sodium formaldehydesulfoxylate | 0.08 part |
| p-Menthane hydroperoxide | 0.06 part |

After the polymerization conversion shown in Table 1 was reached, hydroquinone was added in an amount of 0.2 part per 100 parts of the monomers to terminate the polymerization.

Subsequently, the resulting mixture was heated, and the residual monomers were removed under reduced pressure, after which an antioxidant alkylated allyl phosphite was added to the residue in an amount of 1.5 parts per 100 parts of the rubber solid, and the latex was coagulated with an aqueous calcium chloride solution. The resulting crumbs were washed with water and then dried under reduced pressure at 50° C. to prepare a sample for evaluation. The Mooney viscosity, copolymer composition and glass transition temperature of each of the thus obtained samples are shown in Table 1.

The infrared absorption spectra of the polymers showed a characteristic absorption band of a C≡N bond at 2,200 $cm^{-1}$, and that of a C=O bond of an ester at 1,760 $cm^{-1}$. And they showed a characteristic absorption band of a cis HC=CH bond at 970 $cm^{-1}$. The $T_g$ was measured by differential thermal analysis to find that each of the polymers had a single glass transition temperature shown in Table 1, indicating that it is a copolymer.

TEST OF CHARACTERISTICS OF VULCANIZATION PRODUCT

By use of each of the copolymers shown in Table 1, compositions were prepared according to the following recipe, and vulcanized at 160° C. for 15 minutes.

| Recipe | |
|---|---|
| Polymer | 100 parts |
| Zinc oxide | 5 parts |
| Stearic acid | 1 part |
| Carbon black: MTCB (medial thermal furnace black) | 70 parts |
| Sulfur | 0.5 part |
| Accelerator TT (tetramethylthiuram disulfide) | 1.8 parts |
| Accelerator CZ (N—cyclohexyl-2-benzothiazole sulfenamide) | 2.0 parts |

The characteristics of the thus obtained vulcanization products were determined by the JIS K 6301 method. Their sour gasoline resistance and alcohol-containing gasoline resistance were evaluated by the following methods.

METHOD FOR EVALUATING SOUR GASOLINE RESISTANCE

The term "one cycle" was defined as immersion of each of the samples in a solution of 1 g of lauroyl peroxide in 99 g of Fuel C (a mixed solvent of isooctane and toluene in a volume ratio of 1:1) at 80° C. for 24 hours, and each of them was immersed by 3 cycles and then dried under reduced pressure at 100° C. for 15 hours, after which the elongation at crack and the elongation at break were measured by the JIS K 6301 method, whereby the sour gasoline resistance was evaluated.

METHOD FOR EVALUATING ALCOHOL-CONTAINING GASOLINE RESISTANCE

The alcohol-containing gasoline resistance was evaluated by measuring $\Delta V$ after immersing each of the samples in a solution having a composition: MeOH/Fuel C=20/80, at 40° C. for 48 hours.

The results of the evaluation are shown in Table 2.

As is evident from Table 2, as a rubber material for fuel, the ternary copolymer of this invention has well-balanced characteristics.

EXAMPLES 6 TO 9 AND COMPARATIVE EXAMPLES 9 TO 13

Polymerization was conducted at 50° C. in an autoclave having a capacity of 6 liters by using the monomers and polymerization agents shown below:

| | |
|---|---|
| Acrylonitrile | |
| 1,3-Butadiene | 100 parts |
| Fluorine-containing α-olefin | (see Table 3) |
| $K_2S_2O_8$ | 0.3 part |
| Fatty acid soap | 5.0 parts |
| Tertiary dodecylmercaptan | see Table 3 |

After the polymerization conversion shown in Table 3 was reached, hydroquinone was added in an amount of 0.2 part per 100 parts of the monomers to terminate the polymerization.

Subsequently, the resulting mixture was heated, and the residual monomers were removed under reduced pressure, after which an antioxidant alkylated allyl phosphite was added to the residue in an amount of 1.5 parts per 100 parts of the rubber solid, and the latex was coagulated with an aqueous calcium chloride solution. The resulting crumbs were washed with water and then dried under reduced pressure at 50° C. to prepare a sample for evaluation. The Mooney viscosity, copolymer composition and glass transition temperature of each of the thus obtained samples are shown in Table 3.

The infrared absorption spectra of the polymer showed a characteristic absorption band of a $C\equiv N$ bond at 2,200 cm$^{-1}$, that of a C-F bond at 1,250 to 1,150 cm$^{-1}$, and that of a cis HC=CH bond at 970 cm$^{-1}$.

The glass transition temperature ($T_g$) was measured by differential thermal analysis to find that each of the polymers had a single $T_g$ shown in Table 3, indicating that it is a copolymer.

TEST OF CHARACTERISTICS OF VULCANIZATION PRODUCT

By use of each of the copolymers shown in Table 3, compositions were prepared according to the same recipe as in Example 1, and vulcanized at 160° C. for 15 minutes. The characteristics of the thus obtained vulcanization products were evaluated in the same manner as in Example 1. The evaluation results are shown in Table 4.

As is evident from Table 4, as a rubber material for fuel, the ternary copolymer of this invention has well-balanced characteristics.

TABLE 1

| | Monomers charged (parts) | | | Tertiary dodecyl-mercaptan charged (parts) | Polymerization conversion at termination (%) | Mooney viscosity ($ML_{1+4}^{100°C}$) | Copolymer composition (mole %)*5 | | | Glass transition temperature (Tg) (°C.) |
|---|---|---|---|---|---|---|---|---|---|---|
| | Buta-diene | Acryloni-trile | Fluoroalkyl acrylate | | | | Butadiene | Acrylonitrile | Fluoroalkyl acrylate | |
| Example 1 | 20 | 25 | 55*1 | 0.30 | 60.3 | 65 | 49 | 33 | 18 | −27 |
| Example 2 | 38 | 32 | 30*1 | 0.41 | 63.3 | 36.5 | 59 | 34 | 7 | −28 |
| Example 3 | 15 | 35 | 60*3 | 0.41 | 62.4 | 46.0 | 56 | 35 | 9 | −26 |
| Example 4 | 27 | 44 | 29*2 | 0.40 | 60.0 | 55 | 40 | 35 | 25 | −22 |
| Example 5 | 14 | 50 | 36*4 | 0.50 | 59.0 | 65 | 30 | 40 | 30 | −21 |
| Comparative Example 1 | 62 | 8 | 30*1 | 0.08 | 61.5 | 70.5 | 86 | 7 | 7 | −60 |
| Comparative Example 2 | 60 | 40 | 0 | 0.33 | 71.0 | 70 | 60 | 40 | 0 | −22 |
| Comparative Example 3 | 63 | 32 | 5*1 | 0.45 | 68.0 | 56 | 64 | 35 | 1 | −38 |
| Comparative Example 4 | 50 | 40 | 10*2 | 0.55 | 60.0 | 71 | 47 | 49 | 4 | −15 |
| Comparative Example 5 | 55 | 25 | 20*10 | 0.30 | 59.5 | 77 | 75 | 22 | 3 | −55 |
| Comparative Example 6 | 30 | 20 | 50*2 | 0.30 | 61.0 | 70 | 50 | 10 | 40 | −42 |

TABLE 1-continued

| | Monomers charged (parts) | | | Tertiary dodecyl-mercaptan charged (parts) | Polymerization conversion at termination (%) | Mooney viscosity (ML$_{1+4}^{100°C.}$) | Copolymer composition (mole %)*5 | | | Glass transition temperature (Tg) (°C.) |
|---|---|---|---|---|---|---|---|---|---|---|
| | Butadiene | Acrylonitrile | Fluoroalkyl acrylate | | | | Butadiene | Acrylonitrile | Fluoroalkyl acrylate | |
| Comparative Example 7 | 6 | 81 | 13*2 | 1.00 | 58.0 | — | 20 | 70 | 10 | +47 |
| Comparative Example 8 | 9 | 23 | 68*2 | 0.30 | 60.0 | 66 | 20 | 20 | 60 | −6 |

Note:
*1 1,1-Dihydroperfluoropropyl acrylate was used.
*2 1,1-Dihydroperfluoroethyl acrylate was used.
*3 1,1,7-Trihydroperfluoroheptyl acrylate was used.
*4 1,1-Dihydroperfluorobutyl acrylate was used.
*5 Method for analyzing a copolymer composition.
(a) Determination of fluoroalkyl acrylate by Schoniger's flask combustion method.
(b) Determination of α,β-unsaturated nitrile by Kjeldahl method.
*10 1,1-Dihydroperfluoroheptylacrylate was used.

TABLE 2

| | Example 1 | Example 2 | Example 3 | Example 4 | Example 5 | Comparative Example 1 | Comparative Example 2 |
|---|---|---|---|---|---|---|---|
| Physical properties of vulcanizate | | | | | | | |
| Tensile strength (Kg/cm²) | 150 | 111 | 138 | 160 | 180 | 120 | 137 |
| Elongation (%) | 420 | 430 | 460 | 370 | 340 | 480 | 460 |
| Hardness (JIS-A) | 66 | 64 | 64 | 72 | 75 | 65 | 63 |
| Alcohol-containing gasoline resistance | | | | | | | |
| ΔV (%) | 50.2 | 60.2 | 59.5 | 41.2 | 30.5 | 111 | 76.0 |
| Sour gasoline resistance | | | | | | | |
| Elongation at crack (%) | No crack | No crack | No crack | No crack | No crack | No crack | 50 |
| Elongation at break (%) | 315 | 255 | 290 | 280 | 300 | 220 | 160 |
| Solvent resistance | | | | | | | |
| Fuel C ΔV after immersion at 40° C. for 48 hrs (%) | 27.6 | 32.1 | 30.1 | 20.8 | 15.2 | 86.0 | 39.0 |
| Low-temperature resistance test | | | | | | | |
| Impact brittleness test (°C.) | −24.2 | −25.2 | −23 | −21.5 | −20.2 | −47 | −24.2 |
| Compression set (%) | | | | | | | |
| 120° C. × 70 hrs | 22 | 25 | 24 | 27 | 29 | 12 | 24 |

| | Comparative Example 3 | Comparative Example 4 | Comparative Example 5 | Comparative Example 6 | Comparative Example 7 | Comparative Example 8 |
|---|---|---|---|---|---|---|
| Physical properties of vulcanizate | | | | | | |
| Tensile strength (Kg/cm²) | 133 | 145 | 125 | 120 | — | 100 |
| Elongation (%) | 450 | 390 | 410 | 210 | — | 175 |
| Hardness (JIS-A) | 67 | 69 | 65 | 80 | — | 65 |
| Alcohol-containing gasoline resistance | | | | | | |
| ΔV (%) | 80.0 | 52.0 | 90.0 | 90.2 | — | 56.8 |
| Sour gasoline resistance | | | | | | |
| Elongation at crack (%) | 80 | 185 | 150 | No crack | — | No crack |
| Elongation at break (%) | 165 | 205 | 185 | 190 | — | 160 |
| Solvent resistance | | | | | | |
| Fuel C | | | | | | |

TABLE 2-continued

|  |  |  |  |  |  |  |
|---|---|---|---|---|---|---|
| ΔV after immersion at 40° C. for 48 hrs (%) | 50.0 | 30.2 | 67.0 | 43.8 | — | 29.0 |
| Low-temperature resistance test |  |  |  |  |  |  |
| Impact brittleness test (°C.) | −27.8 | −10.5 | −35.2 | −30.5 | — | −2.2 |
| Compression set (%) |  |  |  |  |  |  |
| 120° C. × 70 hrs | 23 | 30 | 19 | 22 | — | 48 |

Note:
In Comparative Example 7, the product was resinous and hence, the properties could not be determined.

TABLE 3

|  | Monomers charged (parts) | | | Tertiary dodecyl-mercaptan (parts) | Polymerization conversion at termination (%) | Mooney viscosity ($ML_{1+4}$, 100° C.) | Copolymer Composition (mole %)*9 | | | Glass transition temperature (Tg) (°C.) |
|---|---|---|---|---|---|---|---|---|---|---|
|  | Butadiene | Acrylonitrile | Fluorine-containing α-olefin |  |  |  | Butadiene | Acrylonitrile | Fluorine-containing α-olefin |  |
| Example 6 | 40 | 35 | 25*6 | 0.7 | 58.1 | 80 | 61.3 | 33.3 | 5.4 | −32 |
| Example 7 | 45 | 45 | 10*6 | 1.0 | 90.3 | 58 | 62.0 | 34.7 | 3.3 | −34 |
| Example 8 | 30 | 20 | 50*6 | 0.8 | 60.0 | 85 | 63.2 | 25.3 | 11.5 | −37 |
| Example 9 | 25 | 20 | 55*7 | 0.7 | 58.5 | 88 | 59.3 | 25.9 | 14.8 | −33 |
| Comparative Example 9 | 60 | 40 | 0 | 0.33 | 71.0 | 70 | 59.5 | 40.5 | 0 | −22 |
| Comparative Example 10 | 60 | 35 | 5*6 | 0.45 | 68.0 | 56 | 66.0 | 33.3 | 0.7 | −38 |
| Comparative Example 11 | 35 | 10 | 55*6 | 0.5 | 56.2 | 40 | 77.4 | 6.0 | 16.6 | −48 |
| Comparative Example 12 | 40 | 50 | 10*6 | 1.0 | 58.2 | 70 | 50.9 | 46.7 | 2.4 | −10 |
| Comparative Example 13 | 45 | 30 | 25*8 | 0.7 | 59.5 | 83 | 65.7 | 25.8 | 8.5 | −55 |

Note:
*6chlorotrifluoroethylene was used
*7dichlorodifluoroethylene was used
*8vinylidene fluoride was used
*9Same in meaning as Note *5 in Table 1, except that the term "fluoroalkyl acrylate" should read "fluorine-containing α-olefin".

TABLE 4

|  | Example 6 | Example 7 | Example 8 | Example 9 | Comparative Example 9 | Comparative Example 10 | Comparative Example 11 | Comparative Example 12 | Comparative Example 13 |
|---|---|---|---|---|---|---|---|---|---|
| Characteristics of vulcanizate |  |  |  |  |  |  |  |  |  |
| Tensile strength (kg/cm²) | 137 | 117 | 139 | 131 | 137 | 127 | 101 | 137 | 127 |
| Elongation (%) | 460 | 420 | 480 | 470 | 460 | 460 | 410 | 390 | 350 |
| Hardness (JIS-A) | 68 | 66 | 64 | 63 | 63 | 63 | 63 | 71 | 68 |
| Alcohol-containing gasoline resistance |  |  |  |  |  |  |  |  |  |
| ΔV (%) | 55.2 | 59.7 | 50.2 | 48.1 | 76 | 80.4 | 99 | 59.0 | 64 |
| Sour gasoline resistance |  |  |  |  |  |  |  |  |  |
| Elongation at crack (%) | No crack | No crack | No crack | No crack | 50 | 85 | No crack | 135 | No crack |
| Elongation at break (%) | 270 | 250 | 290 | 305 | 160 | 185 | 205 | 195 | 180 |
| Solvent resistance |  |  |  |  |  |  |  |  |  |
| Fuel C ΔV after immersion at 40° C. for 48 hrs (%) | 33.1 | 33.0 | 38.2 | 37.1 | 39 | 47.2 | 87 | 30.2 | 50 |
| Compression set (120° C. × 70 hrs) (%) | 24 | 23 | 18 | 17 | 24 | 23 | 15 | 31 | 25 |
| Low-temperature resistance |  |  |  |  |  |  |  |  |  |
| Impact brittle- |  |  |  |  |  |  |  |  |  |

TABLE 4-continued

|  | Example 6 | Example 7 | Example 8 | Example 9 | Comparative Example 9 | Comparative Example 10 | Comparative Example 11 | Comparative Example 12 | Comparative Example 13 |
| --- | --- | --- | --- | --- | --- | --- | --- | --- | --- |
| ness test (°C.) | −24.5 | −27.0 | −29.0 | −26.0 | −24.2 | −32.8 | −45 | −10.5 | −37.8 |

What is claimed is:

1. A multi-component polymer rubber useful as gasoline fuel line hose consisting essentially of (A) 15–60 mole % of an α,β-unsaturated nitrile selected from the group consisting of acrylonitrile, α-chloroacrylonitrile, α-fluoroacrylonitrile, methacrylonitrile and ethacrylonitrile, (B) 10–75% mole % of a conjugated diene selected from the group consisting of 1,3-butadiene, 2-chloro-1,3-butadiene, 2-fluoro-1,3-butadiene and 2-methyl-1,3-butadiene, and (C) 2–55 mole % of a fluorine-containing compound selected from a fluoroalkyl acrylate or methacrylate, a fluorine-containing α-olefin, or mixtures of same, said fluoroalkyl acrylate or methacrylate having 1–20 carbon atoms in the alkyl group, said polymer rubber having a glass transistion temperature ($T_g$) of −50° C. to −20° C., the percentages of the component (A), (B) and (C) being based on the total sum of the moles of the components (A), (B) and (C).

2. The polymer of claim 1 wherein the α,β-unsaturated nitrile is acrylonitrile.

3. The polymer of claim 2 wherein the conjugated diene is 1,3-butadiene.

4. The polymer of claim 3 wherein said fluorine-containing compound is selected from the group consisting of 1,1-dihydroperfluoroethyl acrylate or methacrylate, 1,1-dihydro-1,1,5-trihydroperfluorohexyl acrylate or methacrylate, 1,1,2,2-tetrahydroperfluoropropyl acrylate or methacrylate, 1,1,7-trihydroperfluoroheptyl acrylate or methacrylate, 1,1-dihydroperfluorooctyl acrylate or methacrylate, 1,1-dihydroperfluorodecyl acrylate or methacrylate, vinylidene fluoride, tetrafluoroethylene, chlorotrifluoroethylene, hexafluoropropylene, 1,1,1-trifluoropropylene and 1-hydropentafluoropropylene.

5. The polymer of claim 4 wherein the fluorine-containing compound is fluoroalkyl acrylate or methacrylate selected from the group consisting of 1,1-dihydroperfluoroethyl acrylate, 1,1-dihydroperfluoroethyl methacrylate, 1,1-dihydroperfluoropropyl acrylate and 1,1-dihydroperfloropropyl methacrylate.

6. The polymer of claim 4 wherein the fluorine-containing compound is chlorotrifluoroethylene, dichlorodifluoroethylene or a mixture thereof.

7. The polymer of claim 5 wherein the acrylonitrile is present in the range of 20–45 mole %, the butadiene is present in the range of 30–70 mole % and the fluoroalkyl acrylate or methacrylate is present in the range of 2–35 mole %.

8. The polymer of claim 5, wherein the acrylonitrile is present in the range of 20–55 mole %, the butadiene is present in the range of 20–75 mole % and the fluoroalkyl acrylate or methacrylate is present in the range of 2–45 mole %.

* * * * *